United States Patent

Kuroda

[15] 3,678,415

[45] July 18, 1972

[54] MULTIPLE PORT HYBRID CIRCUIT

[72] Inventor: Takaji Kuroda, Tokyo, Japan

[73] Assignee: Nippon Electric Company, Limited, Tokyo, Japan

[22] Filed: June 25, 1970

[21] Appl. No.: 49,650

[30] Foreign Application Priority Data

June 30, 1969 Japan....................................44/51644

[52] U.S. Cl.....................................................333/9, 333/11

[51] Int. Cl...........................................................H01p 5/12

[58] Field of Search.................................333/6, 10, 11, 1, 9

[56] References Cited

UNITED STATES PATENTS

| | | | |
|---|---|---|---|
| 2,127,336 | 8/1938 | Leng | 333/9 X |
| 2,660,710 | 11/1953 | Blancher | 333/9 X |
| 3,219,949 | 11/1965 | Heeren | 333/11 X |
| 2,423,390 | 7/1947 | Korman | 333/10 X |
| 2,975,381 | 3/1961 | Reed et al. | 333/10 |

*Primary Examiner*—Paul L. Gensler
*Attorney*—Marn & Jangarathis

[57] ABSTRACT

A hybrid circuit adapted to transmit at least n electromagnetic waves in response to a supplied electromagnetic wave, and to synthesize a single electromagnetic wave from *n* supplied electromagnetic waves is disclosed in accordance with the teachings of the present invention wherein *n* conducting channels comprised of *n* spaced conducting means are disposed intermediate *n* pairs of ports, *n* being an integer greater than two. Said *n* spaced conducting means are further disposed in intersecting relationship with *m* spaced conducting means, where *m* is an integer greater than one, to form discrete junctions at the intersecting points thereof. Each of sald *n* and *m* conducting means include portions interposed between adjacent discrete junctions such that said portions have effective lengths equal to integral multiples of a quarter of the wavelength of a supplied electromagnetic wave.

12 Claims, 17 Drawing Figures

PRIOR ART Fig. 1.
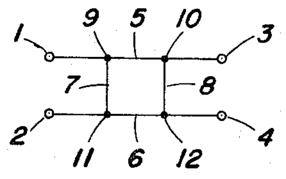
PRIOR ART Fig. 2.
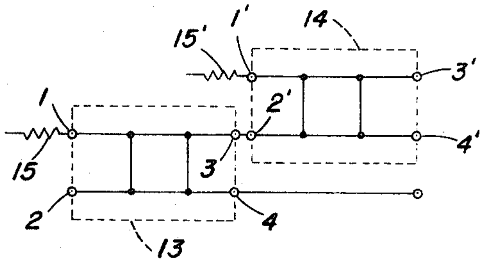
Fig. 3.
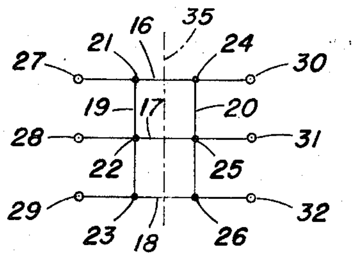
Fig. 5.
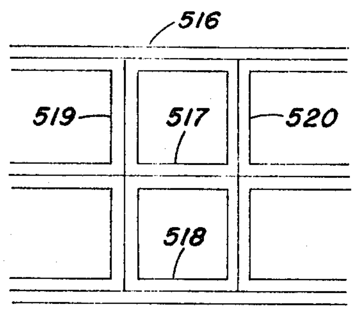
Fig. 6.
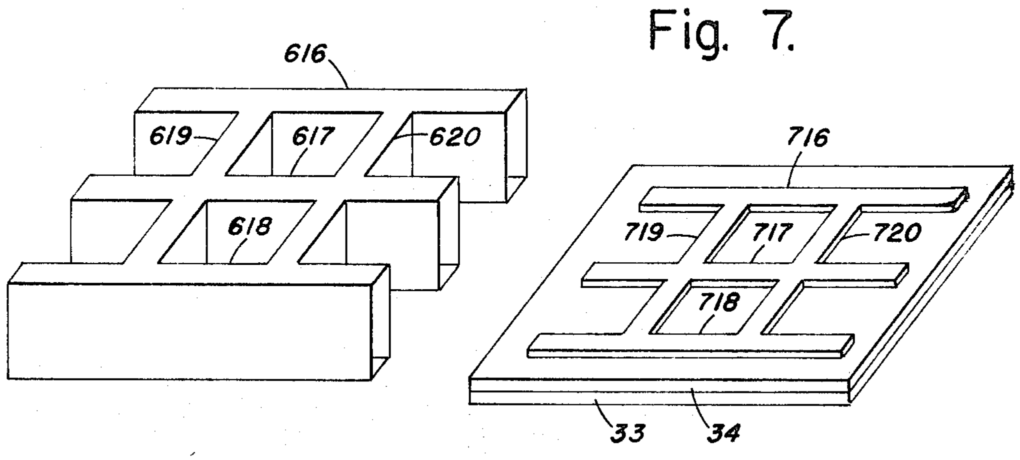
Fig. 6. Fig. 7.
INVENTOR.
Takaji Kuroda
BY
Mann & Jangarathis
ATTORNEYS INVENTOR.
Takaji Kuroda

BY

Marn & Jangarathis

ATTORNEYS

INVENTOR.
Takaji Kuroda
BY
Marn & Jangarathis
ATTORNEYS

INVENTOR
Takaji Kuroda
BY
Marn & Jangarathis
ATTORNEYS

Fig. 13.
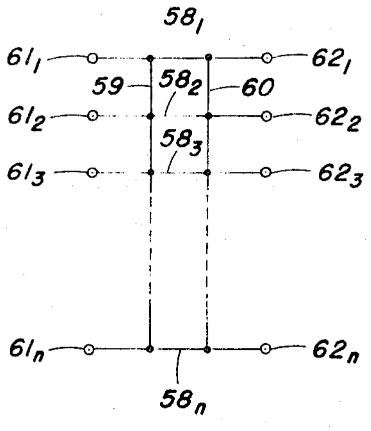
PRIOR ART Fig. 14.
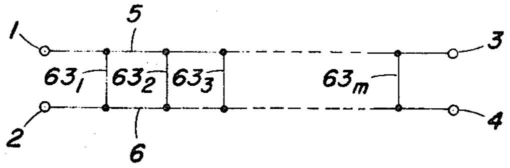
Fig. 15.
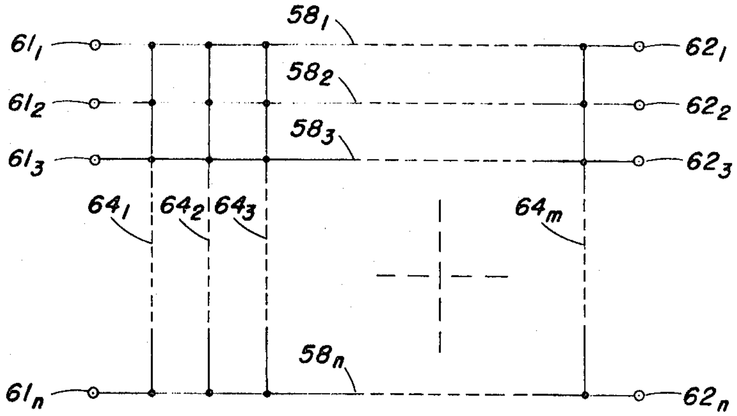
INVENTOR.
Takaji Kuroda
BY
Marn & Jangarathis
ATTORNEYS

MULTIPLE PORT HYBRID CIRCUIT

This invention relates to hybrid circuits and, more particularly, to a hybrid circuit adapted to receive an electromagnetic wave and to transmit proportional values of the received electromagnetic wave to a multiple of output ports.

Conventional hybrid circuits exhibit useful characteristics that are advantageously utilized in contemporary communications systems. The ability of a hybrid circuit to equally distribute the energy transmitted by an electromagnetic wave to two electrical loads coupled to the hybrid circuit are particularly suitable for a variety of applications such as balanced modulation or conversion, microwave switching and frequency discrimination. Since hybrid circuits have found enthusiastic acceptance with regard to microwave techniques, these circuits are generally comprised of electromagnetic wave transmission means such as coaxial transmission lines and waveguides. A typical hybrid circuit constructed of rectangular waveguides consists of a main longitudinally disposed rectangular waveguide which is joined at an intermediate junction point to two further rectangular waveguides forming a unitary structure having four arms. The longitudinal axes of the three rectangular waveguides are mutually perpendicular and, in addition, the longitudinal axes of the main waveguide and a first of the two further waveguides lie in the plane of the E vector of an electromagnetic wave and the longitudinal axes of the main waveguide and a second of the two further waveguides lie in the plane of the H vector of said electromagnetic wave. Hence, the prior art has adopted the convention of designating the aforementioned first waveguide as the E arm, the aforementioned second waveguide as the H arm, and each section of the main waveguide disposed with respect to the intermediate junction point is designated as a collinear arm. The connection of the E arm to the collinear arms is equivalent to a series electrical connection and the connection of the H arm to the collinear arms is equivalent to a shunt or parallel electrical connection.

Thus formed, the prior art hybrid circuit, or, as it is also known, the hybrid T or "magic" T, is characterized by its unique operation. If the hybrid circuit is electrically matched to the external circuits, or electrical loads, to which it is coupled, and if no energy is reflected from the intermediate junction point, then there is substantially no signal coupling between the E arm and the H arm. Consequently, energy supplied to the E arm is distributed equally to each collinear arm and no energy is transmitted to the H arm. Similarly, energy supplied to the H arm is distributed equally to each collinear arm. And energy supplied to one collinear arm is distributed equally to the E arm and the H arm, respectively. In addition, energy supplied simultaneously and in equal amounts to both collinear arms is combined at the H arm and subtracted at the E arm. An attendant disadvantage of the prior art hybrid circuit is the limitation of the distribution of energy thereby. An electromagnetic wave supplied at one input port will be transmitted to only two output ports. Consequently, a system that requires the distribution of more than two electromagnetic waves necessitates the use of a plurality of intercoupled prior art hybrid circuits. Such intercoupling of hybrid circuits introduces complex design problems attributable to unmatched electrical circuits which cause deleterious reflections. The conventional solution of these problems serves to constrain the bandwidth of the signals which may be supplied to the hybrid circuits, thereby restricting the utility thereof. A further disadvantage of the prior art is the unwieldly configuration of the intercoupled hybrid circuits. The requirement of mutual perpendicularity of the longitudinal axes of the E arm, the H arm and the collinear arms results in a unitary construction of relatively large size.

Therefore, it is an object of the present invention to provide a hybrid circuit wherein a supplied electromagnetic wave is transmitted to a plurality of ports.

It is another object of the present invention to provide a hybrid circuit wherein a supplied electromagnetic wave is distributed to at least three ports in a desired proportion.

It is a further object of this invention to provide a hybrid circuit adapted for the substantially reflectionless transmission of electromagnetic waves to at least three ports over a relatively wide range of frequencies.

It is yet another object of this invention to provide a hybrid circuit wherein an electromagnetic wave is synthesized from a plurality of supplied electromagnetic waves.

It is an additional object of the present invention to provide a multiple port hybrid circuit of unitary construction and relatively simple configuration.

Various other objects and advantages of the invention will become clear from the following detailed description of exemplary embodiments thereof, and the novel features will be particularly pointed out in connection with the appended claims.

In accordance with this invention a hybrid circuit including at least three pairs of ports is provided wherein said hybrid circuit is comprised of a first plurality of conducting means, each of said conducting means intercoupling an associated pair of ports, and a second plurality of conducting means disposed in intersecting relationship with said first plurality of conducting means such that each of said second plurality of conducting means intersects each of said first plurality of conducting means at a discrete junction, whereby that portion of each of said first and second conducting means interposed between adjacent discrete junctions is of an electrical length equal to a multiple of one-fourth of the wavelength of the electromagnetic waves supplied to said hybrid circuit; the characteristic admittances of said portions conforming to a desired relation whereby an electromagnetic wave supplied to one of said ports is proportionally transmitted to at least three of the remaining ports.

The invention will be more clearly understood by reference to the following detailed description of exemplary embodiments thereof in conjunction with the accompanying drawings in which:

FIG. 1 is a schematic diagram of a prior art hybrid circuit;

FIG. 2 is a schematic diagram of intercoupled prior art hybrid circuits;

FIG. 3 is a schematic diagram of a hybrid circuit in accordance with the present invention;

FIG. 5 is an illustrative diagram of a practicable embodiment of the present invention;

FIG. 6 is an illustrative diagram of another practicable embodiment of the present invention;

FIG. 7 is an illustrative diagram of still another practicable embodiment of the present invention;

FIG. 13 is a schematic diagram of a general embodiment of the present invention;

FIG. 14 is a schematic diagram of a prior art ladder-type hybrid circuit exhibiting wide band frequency characteristics; and FIG. 15 is a modification of the schematic diagram of FIG. 13 to obtain wider band frequency characteristics.

Figure 4A:
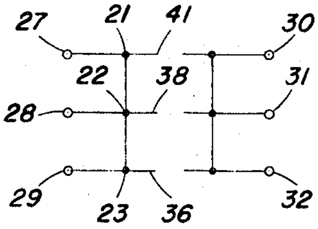
FIGS. 4A–4C are schematic diagrams of equivalent portions of the hybrid circuit of the present invention which facilitate understanding of the present invention.

Referring now to the drawings, wherein like reference numerals are used throughout, and in particular to FIG. 1, there is illustrated a schematic diagram of a hybrid circuit in accordance with the prior art. The prior art hybrid circuit is comprised of four ports 1, 2, 3, and 4, which may comprise four pairs of input terminals or four input ports to waveguide means. If the four ports 1, 2, 3, and 4 are four pairs of input terminals, it is understood that one terminal of each pair may comprise a common terminal, or ground, and need not be shown in the illustration. The schematic diagram of FIG. 1 may represent a conventional ladder network hybrid circuit. Ports 1 and 3 are intercoupled by conducting means 5 and ports 2 and 4 are intercoupled by conducting means 6. Conducting means 5 and 6 may comprise conventional electromagnetic wave transmission means such as waveguides or the like, and may be disposed in parallel relationship. Junctions 9 and 10 are located at discrete points along the length of conducting means 5 and junctions 11 and 12 are similarly located along the length of conducting means 6 in symmetrical relation with the former junctions. Junction 9 is coupled to junction 11 by conducting means 7 and junction 10 is coupled to junction 12 by conducting means 8. Conducting means 7 and 8 may be similar to conducting means 5 and 6 and may comprise waveguides, coaxial cables, strip transmission lines or the like. The effective length of those portions of conducting means 5, 6, 7, and 8 interposed between junctions 9, 10, 11, and 12 is equal to one-fourth of the wavelength of the electromagnetic waves supplied to the ports 1, 2, 3, and 4. One skilled in the art will recognize that a length of conducting means equal to a quarter of the wavelength of an electromagnetic wave is advantageously chosen for purposes of reflectionless matching.

The operation of the prior art hybrid circuit, illustrated in FIG. 1, is well known and need not be described in detail herein. The reader is referred to various textbooks and technical articles for the particular details thereof. Accordingly it may merely be stated that an electromagnetic wave supplied to port 1 will be transmitted to and divided between ports 3 and 4, whereas port 2 will not be provided with an electromagnetic wave. Similarly, an electromagnetic wave supplied to port 2 will not be transmitted to port 1, but will be divided between ports 3 and 4. The hybrid circuit is of symmetrical construction and, therefore, ports 1 and 2 are interchangeable with ports 3 and 4 so that an electromagnetic wave supplied to port 3 will be divided between ports 1 and 2, and an electromagnetic wave supplied to port 4 will be divided between ports 1 and 2. The characteristic impedance of each of conducting means 5, 6, 7, and 8 is determined by the physical characteristics of the conducting means. Hence, if the conducting means are rectangular waveguides, the characteristic impedance thereof may be determined by the width of the narrow wall of the waveguide. Similarly, if the conducting means are coaxial cables, the characteristic impedance thereof may be determined by the diameter of the inner conductor. Likewise, if the conducting means are strip transmission lines, the characteristic impedance thereof may be determined by the thickness of the strip. Now, if the characteristic impedance of that portion of conducting means 5 interposed between junctions 9 and 10 is proportional to the characteristic impedance of that portion of conducting means 7 interposed between junctions 9 and 11 in the ratio of $1/\sqrt{2}$, and if the characteristic impedance of that portion of conducting means 6 interposed between junctions 11 and 12 is proportional to the characteristic impedance of that portion of conducting means 8 interposed between junctions 10 and 12 in said ratio of $1/\sqrt{2}$, then the hybrid circuit is effective to equally distribute an electromagnetic wave supplied thereto. In other words, the magnitude of the electromagnetic wave provided by port 3 is equal to the magnitude of the electromagnetic wave provided by port 4 and one-half the magnitude of the electromagnetic wave supplied to port 1. It is recognized that this relationship is also satisfied if the electromagnetic wave is supplied to port 2. In addition, if electromagnetic waves of equal amplitude are supplied to ports 3 and 4, an electromagnetic wave equal to the sum of the supplied electromagnetic waves is provided at port 1 and an electromagnetic wave equal to the difference of the supplied electromagnetic waves is provided at port 2. Since the relative magnitudes of the electromagnetic waves provided at ports 3 and 4 in response to an electromagnetic wave supplied to port 1 is determined by the aforedescribed characteristic impedances, it should be recognized that the ratio in which the supplied electromagnetic wave is distributed may be varied by varying the characteristic impedances of appropriate conducting means 5, 6, 7, and 8.

The inherent limitation of the prior art hybrid circuit of FIG. 1 resides in the distribution of a supplied electromagnetic wave to no more than two output electromagnetic waves. Although the magnitudes of the electromagnetic waves provided by ports 3 and 4 may be varied in accordance with the characteristic impedances of the conducting means 5, 6, 7, and 8, the requirement of no coupling between ports 1 and 2 is essential for the proper operation of the hybrid circuit. Accordingly, if a single electromagnetic wave is to be proportionally transmitted to three circuits, or electrical loads, two hybrid circuits must be employed. FIG. 2 illustrates the manner in which two prior art hybrid circuits are coupled to provide distribution of a supplied electromagnetic wave to three ports, and comprises hybrid circuits 13 and 14. Hybrid circuit 13 may be identical to hybrid circuit 14, each of which comprises a four port hybrid circuit similar to the aforedescribed circuit of FIG. 1. The ports of hybrid circuit 14 are identified with primed reference numerals corresponding to the reference numerals utilized to identify the ports of hybrid circuit 13. For purposes of explanation it is assumed that the prior art hybrid circuit is of the ladder-type configuration. Port 3 of hybrid circuit 13 is coupled to port 2′ of hybrid circuit 14, and ports 1 and 1′ of the hybrid circuits are connected to reflectionless impedance means 15 and 15′, respectively.

The operation of the circuit of FIG. 2 is now described. Hybrid circuits 13 and 14 each operate in the manner described hereinabove with respect to FIG. 1 and further description of the individual operations thereof is not necessary. An electromagnetic wave supplied to port 2 of hybrid circuit 13 is divided in the porportional ratio determined by the appropriate characteristic impedances thereof, and the divided electromagnetic waves are provided at ports 3 and 4. As is understood, there is substantially no coupling between ports 1 and 2. However, in the event of an unmatched condition which results in minimal coupling between ports 1 and 2, reflectionless impedance means 15 is adapted to effectively absorb an electromagnetic wave that might be coupled to port 1. The electromagnetic wave provided at port 3 of hybrid circuit 13 is supplied to port 2′ of hybrid circuit 14 by the electrical connection therebetween. This supplied electromagnetic wave is divided in the proportional ratio determined by the appropriate characteristic impedances of hybrid circuit 14, and the divided electromagnetic waves are provided at ports 3′ and 4′. Reflectionless impedance means 15′ is connected to port 1′ and is adapted to perform the same function as aforementioned reflectionless impedance means 15. If the characteristic impedances of the conducting means of the hybrid circuit 13 are properly selected, the electromagnetic wave supplied to port 2 is equally divided and electromagnetic waves of magnitude equal to one-half the magnitude of the electromagnetic wave supplied to port 2 are provided at ports 3 and 4, respectively. The electromagnetic wave provided by port 3 is supplied to port 2′ of hybrid circuit 14, as aforesaid. If the characteristic impedances of the conducting means of hybrid circuit 14 are properly selected, the electromagnetic wave supplied to port 2′ is equally divided and electromagnetic waves of magnitude equal to one-half the magnitude of the electromagnetic wave supplied to port 2′ are provided at ports 3′ and 4′, respectively. Thus, the magnitude of the electromagnetic wave provided at port 4 is equal to one-half the magnitude of the electromagnetic wave supplied to port 2 and the magnitude of the electromagnetic wave provided at each port 3′ and 4′ is equal to one-fourth the magnitude of the electromagnetic wave supplied to port 2. Accordingly, conventional utilization of prior art hybrid circuits to distribute a single electromagnetic wave to three circuits results in the provision of three electromagnetic waves admitting of magnitudes that are related by the proportion 2:1:1. If three electromagnetic waves of equal magnitudes are desired, it is evident that the magnitudes of the electromagnetic waves provided at ports 3 and 4 of hybrid circuit 13 must bear the ratio 2:1. As is understood from the description of FIG. 1, this ratio may be obtained by selectively varying the characteristic impedances of the conducting means of the hybrid circuit 13. This, however, alters the symmetry of the hybrid circuit and introduces undesired reflections therein.

It should now be readily apparent that the distribution of a supplied electromagnetic wave to *a* further means heretofore necessitated the use of *a*—1 prior art hybrid circuits. As *a* increases, the number of hybrid circuits increases, resulting in an unwieldly length between the initial port, such as port 2 of FIG. 2, and the final output ports, such as ports 3′ and 4′. In addition, the cost and complexity of the total distribution network rapidly becomes unreasonable as the number of intercoupled hybrid circuits increases. The hybrid circuit in accordance with the present invention obviates the requirement of combining a plurality of hybrid circuits to achieve multiple distribution of a single electromagnetic wave.

Referring now to FIG. 3, there is illustrated a schematic diagram of the hybrid circuit of the present invention and comprises ports 27, 28, 29, 30, 31, and 32 and conducting means 16, 17, 18, 19, and 20. Ports 27–32 are arranged in operative pairs and each pair of ports is provided with a conducting channel therebetween comprised of one of said conducting means. As seen from the schematic diagram, ports 27 and 30 are interconnected by conducting means 16, ports 28 and 31 are interconnected by conducting means 17 and ports 29 and 32 are interconnected by conducting means 18. Each of the ports 27–32 may comprise a pair of terminals adapted to receive an electromagnetic wave applied thereto, or an opening in a waveguide, or other well known entrances or exits to electromagnetic wave networks. The precise nature of the ports 27–32 is dependent upon the configuration of conducting means 16–18, each of which conducting means comprises electromagnetic wave transmission means, described in more detail hereinbelow. Conducting means 19 and 20, similar to conducting means 16–18, are disposed in intersecting relationship with said conducting means 16–18, thereby forming an array of discrete junctions 21, 22, 23, 24, 25, and 26. Conducting means 19 and 20 and conducting means 16–18 are spaced whereby each of said former conducting means intersects each of said latter conducting means at one of the discrete junctions 21–26. The length of each portion of each conducting means 16–20 interposed between adjacent discrete junctions is effectively equal to a multiple of a quarter of the wavelength of the electromagnetic wave which may be supplied to ports 27–32. Hence, if $\lambda$ represents the wavelength of the electromagnetic wave for which the schematically illustrated hybrid circuit of FIG. 3 is adapted, then each of conducting means 16, 17, and 18 includes a portion interposed between discrete junctions 21 and 24, 22 and 25 and 23 and 26, respectively, said portion admitting of length $x\lambda/4$, where $x$ is a positive integer. Similarly, each of conducting means 19 and 20 includes a first portion interposed between discrete junctions 21 and 22, and 24 and 25, respectively, and a second portion interposed between discrete junctions 22 and 23, and 25 and 26, respectively; said first and second portions each admitting of length $x\lambda/4$.

Conducting means 19 and 20 appear to be perpendicularly disposed with respect to conducting means 16–18 in FIG. 3. Such geometric relationship, however, is not essential to the present invention, and the angles at which the conducting means intersect may obtain any convenient value. The intrinsic feature of the hybrid circuit of the present invention is the quarter wavelength portions of conducting means interposed between adjacent discrete junctions.

Conducting means 16–20 exhibit characteristic admittances which determine the electromagnetic wave distribution and synthesis properties of the hybrid circuit of FIG. 3. The coupling between ports and the proportional division of electromagnetic waves supplied to said ports is dependent upon the characteristic admittances. Accordingly, the characteristic admittances of conducting means 16–20 may admit of a first relation whereby an electromagnetic wave supplied to port 28 is transmitted to ports 30, 31, and 32, but effectively inhibited from being transmitted to ports 27 and 29. Similarly, said characteristic admittances may admit of a second relation whereby an electromagnetic wave supplied to port 28 is transmitted to ports 27, 29, 30, and 32, but effectively inhibited from being transmitted to port 31. The manner in which said characteristic admittances may be determined to satisfy the foregoing relations now follows. It is apparent that the hybrid circuit illustrated in FIG. 3 is of symmetrical configuration. Accordingly, if the hybrid circuit is bisected by line 35, the symmetry of the hybrid circuit with respect to line 35 remains. If, now, symmetrical voltages of equal amplitude and phase are applied to ports 28 and 31, it is understood that the current at line 35 in response to the voltage applied to port 28 is equal to, but out of phase with, the current at line 35 in response to the voltage applied to port 31. Therefore, the total current at line 35 is zero. Consequently, the hybrid circuit of FIG. 3 may be represented by the schematic diagram of FIG. 4A wherein line 35 is equivalent to an open circuit along the axis of symmetry. Now, if antisymmetrical voltages of equal amplitude and opposite phases are applied to ports 28 and 31, it will be seen that the voltage induced at line 35 in response to the voltage applied to port 28 is equal to, but out of phase with, the voltage induced at line 35 in response to the voltage applied to port 31. Thus, the total voltage at line 35 is zero and the axis of symmetry of the hybrid circuit is equivalent to a short circuit. FIG. 4B is a representative schematic diagram of this equivalent circuit. One skilled in the art will recognize that the foregoing is an application of Bartlett's bisection theorem to the hybrid circuit of FIG. 3.

Figure 4B:
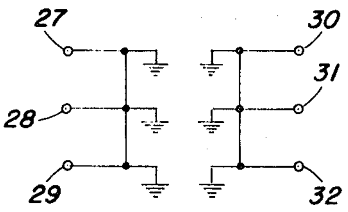
Figure 4C:
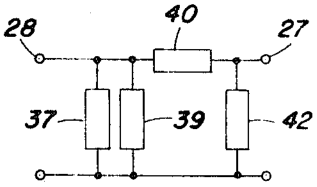

The equivalent circuits of FIGS. 4A and 4B may be utilized to determine the characteristic admittances between the ports of the hybrid circuit. For example, to ascertain the characteristic admittance between port 28 and port 27, the equivalent circuit of FIG. 4A may be represented by the $\pi$ network of FIG. 4C comprised of ports 27 and 28 and admittances 37, 39, 40 and 42. Admittance 37, connected to port 28, is the combination of the admittance between junctions 22 and 23, the admittance between junction 23 and the open-circuited axis of symmetry, and the admittance between junction 23 and port 29. Admittance 39, connected in parallel relationship with admittance 37, represents the admittance between junction 22 and the open-circuited axis of symmetry. Admittance 40 is connected in series between ports 28 and 27 and represents the admittance between junctions 21 and 22; and admittance 42 is connected to port 27 and represents the admittance between junction 21 and the open-circuited axis of symmetry. The admittance matrix of the $\pi$ network may be readily obtained by applying conventional circuit analysis thereto, and may be represented by $Y_f$. The equivalent circuit of FIG. 4B may be represented by a $\pi$ network between terminals 28 and 27, not shown, similar to the $\pi$ network of FIG. 4C, and the admittance matrix thereof, $Y_s$, may likewise be obtained. Once the admittance matrices $Y_f$ and $Y_s$ are computed, the characteristic admittance Yo between ports 28 and 27 may be determined by the expression $Yo = \sqrt{Y_f Y_s}$ as is well known in the prior art.

The foregoing procedure may be adopted to determine the characteristic admittances between ports 28 and 29, ports 30 and 31, ports 31 and 32, ports 27 and 30, ports 28 and 31 and ports 29 and 32, and further description thereof is not deemed necessary. If it is desired that an electromagnetic wave supplied to port 28 be inhibited from being transmitted to port 27 and 29, and if it is desired to set the reflection coefficients at each of ports 27–32 substantially equal to zero, then the characteristic admittances determined in the aforedescribed manner must comply with the mathematical relation:

$$1+2A^2-BC=0 \qquad \text{Eq. (1)}$$

$$B=C \qquad \text{Eq. (2)}$$

where $A$ represents the characteristic admittance of the individual portions of conducting means 19 and 20 interposed between junctions 21 and 22, 22 and 23, 24 and 25, and 25 and 26, respectively; $B$ represents the characteristic admittance of the individual portions of conducting means 16 and 18 interposed between junctions 21 and 24 and junctions 23 and 26, respectively; and $C$ represents the characteristic admittance of that portion of conducting means 17 interposed between junctions 22 and 25. When the characteristic admittances of the respective portions of the hybrid circuit of FIG. 3 satisfy Equation (1) such that $A=1$ and $B=C=\sqrt{3}$, then an electromagnetic wave supplied to port 28 produces a proportional electromagnetic wave at each of ports 30, 31 and 32 and an electromagnetic wave of substantially zero value at ports 27 and 29. The amplitude of each electromagnetic wave provided at ports 30–32 is equal to one-third of the amplitude of the electromagnetic wave supplied to port 28. Hence, when the foregoing relation between the characteristic admittances obtains, an electromagnetic wave received by the hybrid circuit of the present invention is distributed in the ratio 1:1:1. Conversely, if electromagnetic waves of equal amplitudes are supplied to ports 30–32, respectively, an electromagnetic wave is synthesized at port 28 having an amplitude equal to the sum of said equal amplitudes, whereas electromagnetic waves of substantially zero amplitude are provided at ports 27 and 29. If Equation (1) is satisfied such that $A = 1/\sqrt{2}$ and $B=C=\sqrt{2}$, then electromagnetic waves are provided at ports 30, 31 and 32 in accordance with a ratio of distribution of 1:2:1 in response to an electromagnetic wave supplied to port 28. In addition, electromagnetic waves of substantially zero value are provided at ports 27 and 29. Consequently, if the hybrid circuit of FIG. 3 is to be utilized to distribute a single electromagnetic wave to three further means, it is evident that conducting means 16 and 18 need not be provided with ports 27 and 29, respectively; or, alternatively, ports 27 and 29 may be coupled to conventional reflectionless terminating means. If the characteristic admittance of each portion of each conducting means is equal; i.e., if $A=B=C=1$, it is clear that the mathematical relation expressed by Equation (1) is not satisfied. Nevertheless, it has been observed that when the characteristic admittances are set equal to each other, an electromagnetic wave supplied to port 28 induces an electromagnetic wave at each of ports 27, 29, 30, and 32 having an amplitude equal to one-fourth the amplitude of the supplied wave. However, port 31 is not provided with an electromagnetic wave.

Conducting means 16–20 have been described hereinabove as comprising well known electromagnetic wave transmission means. FIG. 5 illustrates one embodiment of the hybrid circuit of FIG. 3 comprised of a unitary structure of intersecting coaxial cable means wherein coaxial cables 516, 517, and 518 correspond to conducting means 16, 17, and 18, and coaxial cables 519 and 520 correspond to conducting means 19 and 20. The precise dimensions and composition of the unitary structure of coaxial cable means is not necessary for the complete understanding of the present invention, and is not provided herein. It is, of course, understood that the characteristic admittance of portions of the coaxial cables is dependent upon the diameter of the inner conductor thereof. Hence, the characteristic admittances may be varied accordingly.

FIG. 6 illustrates another embodiment of the present invention comprised of conventional intersecting rectangular waveguide means forming a unitary structure. Waveguides 616–620 correspond to conducting means 16–20, respectively. The dimensions of the waveguides are determined by the particular application of the hybrid circuit of the present invention; although it is recognized that the characteristic admittances thereof are determined by the dimension of the narrow wall of the waveguide. If desired, the waveguide means may be comprised of circular waveguides or other conventional configuration. A further embodiment of the present invention is illustrated in FIG. 7 which comprises a unitary structure of intersecting strip transmission line means. A plate of conducting material 33 is disposed in a first plane. A sheet of dielectric material 34 is mounted upon and mechanically supported by said plate of conducting material 33. Alternatively, the dielectric material 34 may be coated upon plate 33. Intersecting strips of conducting material 716–720 correspond to conducting means 16–20 and are mounted on dielectric material 34, thereby being disposed in a second plane parallel to said first plane. Conducting strips 716–720 may be of the same material as plate 33 as is well known to those of ordinary skill in the art. A further embodiment of the present invention, although not shown, may be comprised of two-wire transmission line means.

Figure 8:
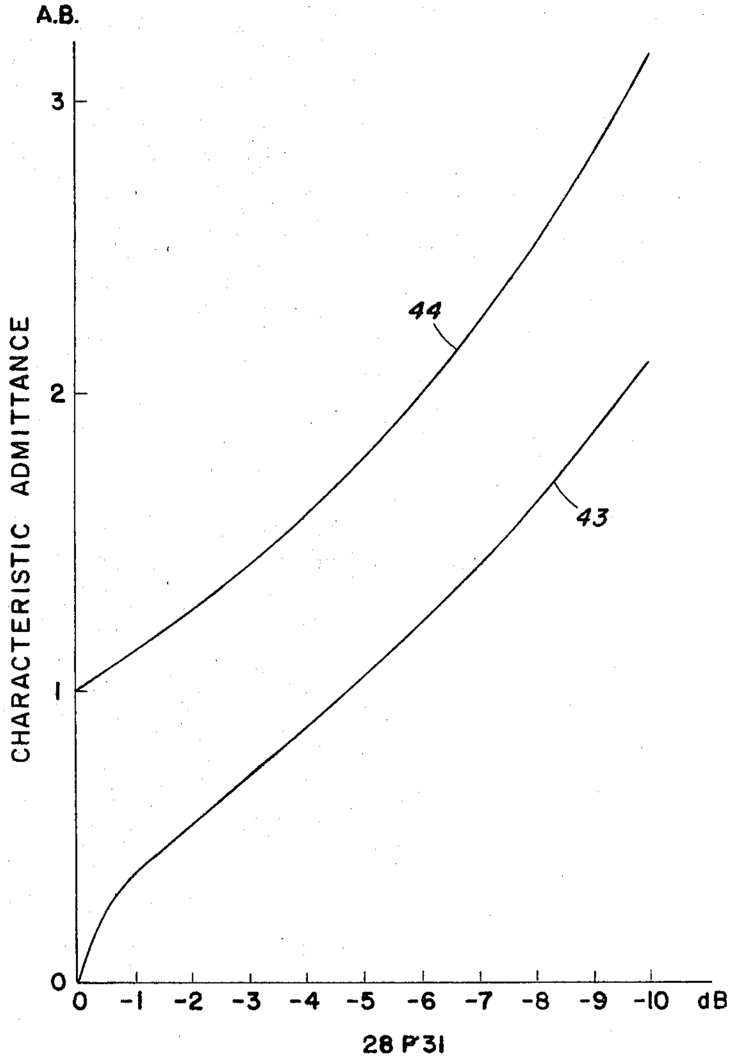
FIG. 8 is a graphical representation of characteristic admittances exhibited by portions of the schematic diagram of FIG. 3.

The characteristic admittances of the hybrid circuit of the present invention, determined in the aforesaid manner, may be utilized to determine the transmission coefficients between selected ports. The transmission coefficient is a measure of the attenuation of an electromagnetic wave transmitted from one port to another. Stated otherwise, the transmission coefficient is a measure of coupling between ports. Hereinafter, the transmission coefficient shall be represented by P, and the transmission coefficient between ports $x$ and $Y$ shall be indicated as $x$ P$y$. FIG. 8 is a graphical representation of the relation between the transmission coefficient between ports 28 and 31, 28P31, and the characteristic admittances $A$ and $B$ of the portions of conducting means 16–20, it being understood that $B = C$. The abscissa of the graph of FIG. 8 represents the transmission coefficient 28P31 in terms of decibels (db) and the ordinate of the graph represents the characteristic admittance. It is recognized that the maximum value obtainable by a transmission coefficient is 1, which is equal to 0 db. Curve 43 represents the characteristic admittance $A$ of the hybrid circuit of the present invention which satisfies Equation (1) and indicates that as the transmission coefficient 28P31 decreases; i.e., as the electromagnetic wave transmitted from port 28 to port 31 is attenuated, the characteristic admittance $A$ increases. Curve 44 represents the characteristic admittance $B$ of the hybrid circuit of the present invention which satisfies Equation (1 1) and it is observed that the characteristic admittance $B$ varies with the transmission coefficient 28P31 in a similar manner as characteristic admittance A. FIG. 8 may be utilized to determine the pertinent characteristic admittances for a desired transmission coefficient 28P31. Accordingly, designation of a desired transmission coefficient 28P31 is equivalent to a specification of the characteristic admittances of the conducting means 16–20 which determines the properties of the hybrid circuit of the present invention.

Figure 9:
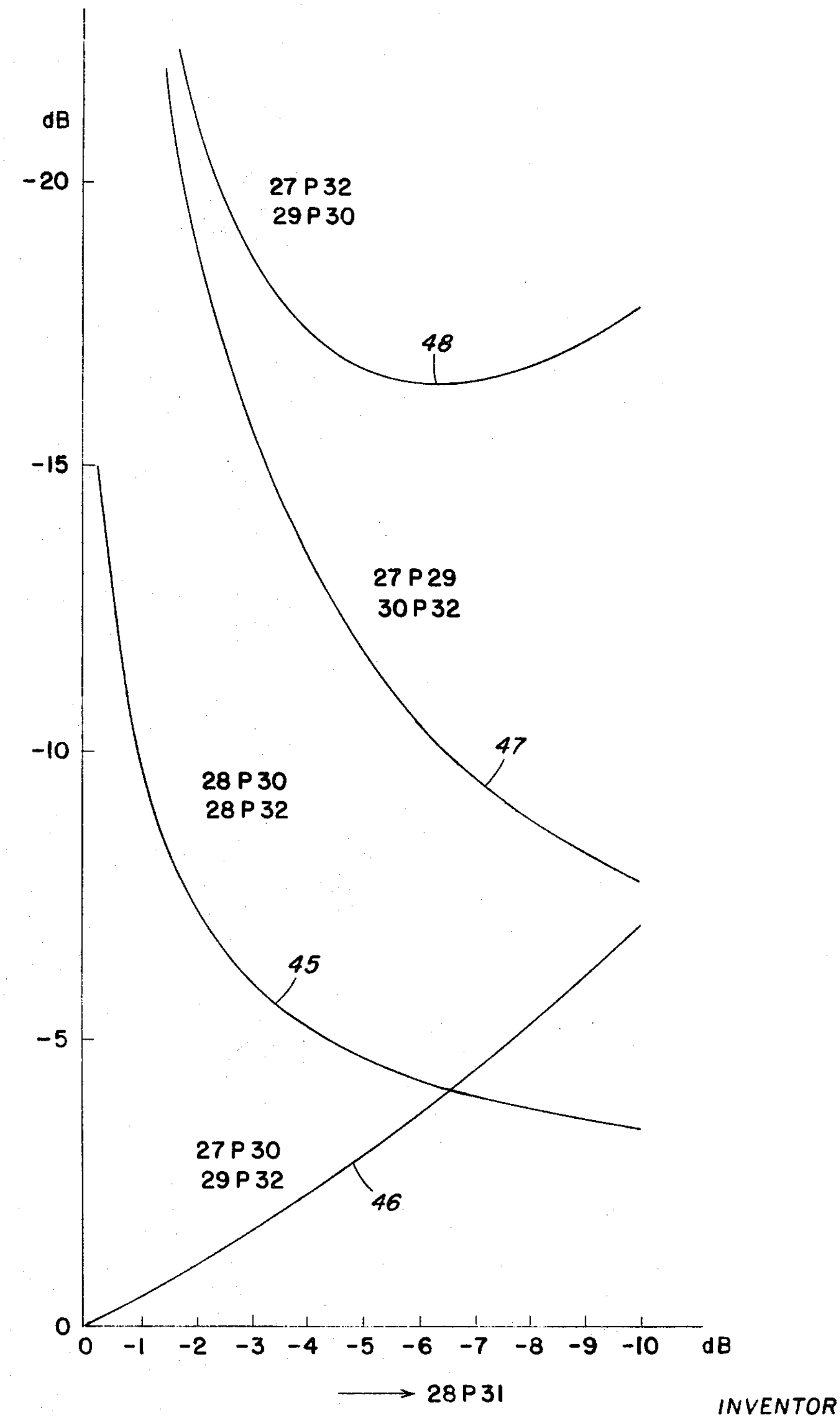
FIG. 9 is a graphical representation of the transmission coefficients exhibited by portions of the schematic diagram of FIG. 3.

The manner in which the transmission coefficients between the remaining ports of the hybrid circuit of FIG. 3 vary with the characteristic admittances is graphically illustrated in FIG. 9 wherein the abscissa represents the transmission coefficient 28P31 in decibels (db) and the ordinate represents attenuation in decibels (db) of an electromagnetic wave. It is understood from the foregoing description that a value of characteristic admittances A and B which satisfy Equation (1) are uniquely determined for each value of the transmission coefficient 28P31. Curve 45 represents the transmission coefficient 28P30 between ports 28 and 30 and the transmission coefficient 28P32 between ports 28 and 32. As the transmission coefficient 28P31 decreases, the transmission coefficients 28P30 and 28P32 increase. The point on FIG. 9 at which all three transmission coefficients are equal corresponds to the point at FIG. 8 where characteristic admittance $A$ is equal to 1 and characteristic admittance $B$ is equal to $\sqrt{3}$. This, of course, is expected in view of the description set forth above. Curve 46 represents the transmission coefficients between ports 27 and 30, 27P30, and between ports 29 and 32, 29P32, respectively. The latter transmission coefficients tend to vary in essentially linear relation with transmission coefficient 28P31. Hence, as the attenuation of an electromagnetic wave transmitted between ports 28 and 31 increases, the attenuation of electromagnetic waves transmitted between ports 27 and 30 and between ports 29 and 32 increases. Curve 47 represents the transmission coefficient 27P29 between ports 27 and 29, and the transmission coefficient 30P32 between ports 30 and 32. The relatively high attenuating properties between these ports may be seen from curve 47, which indicates minimal coupling therebetween, thereby illustrating the desirable isolation characteristics of the hybrid circuit of the present invention. Curve 47 also represents the reflection coefficients at ports 27, 29, 30, and 32. The coupling between ports 27 and 32 and between ports 29 and 30 is observed to be minimal, as illustrated by curve 48 which represents the transmission coefficient 27P32 and transmission coefficient 29P30. Although these transmission coefficients do not remain constant and exhibit a dependency upon the transmission coefficient 28P31, the transmission coefficients 27P32 and 29P30 are nevertheless relatively small. It is understood that the symmetry of the hybrid circuit of the present invention enables each curve of FIG. 9 to represent the transmission coefficients between symmetrical ports. One skilled in the art will recognize that FIGS. 8 and 9 may be utilized to design a hybrid circuit in accordance with the present invention, having desired features. Preferred transmission coefficients may be selected from the curves of FIG. 9. The corresponding transmission coefficient 28P31 is specified by such selection, and the value thereof may be transferred to FIG. 8, thereby specifying the characteristic admittances $A$ and $B$ (it is recalled that $B=C$).

Figure 10:
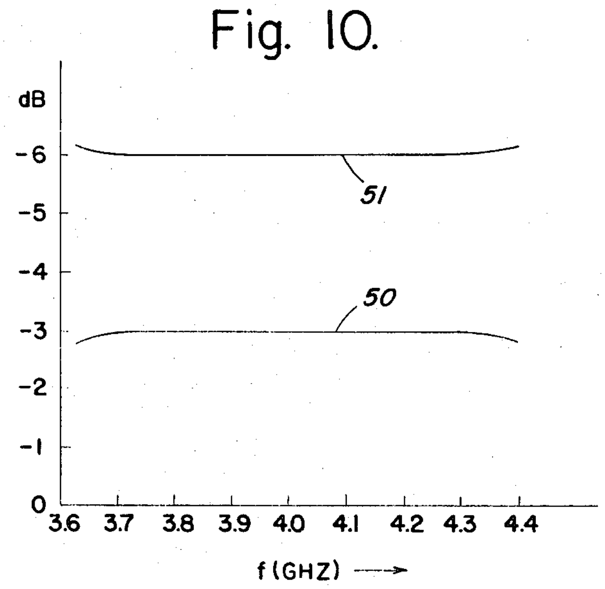
FIG. 10 is a graphical representation of the stability of the present invention over a relatively wide bandwidth.

Extensive experimentation has disclosed that the properties exhibited by the hybrid circuit of the present invention are relatively stable over a wide range of frequencies. FIG. 10 is a graphical representation of the variation in transmission coefficients 28P31, 28P30, and 28P32 with frequency. The abscissa represents the frequency of an electromagnetic wave applied to port 28 and the ordinate represents signal attenuation in decibels (db). For the particular case where $A=1/\sqrt{2}$ and $B=C=\sqrt{2}$, the electromagnetic wave provided at port 31 is twice as great as each of the electromagnetic waves provided at ports 30 and 32. Curve 50 illustrates that for these values of characteristic admittances, the transmission coefficient 28P31 remains relatively stable over a frequency range of almost 1,000 MHz. Similarly, curve 51 illustrates that the transmission coeffients 28P30 and 28P32 remain relatively constant throughout said frequency interval. In addition, it has been found that if the characteristic admittances $A$, $B$ and $C$ are altered to a sufficient degree wherein Equations (1) and (2) are no longer satisfied; for example, if $A=1/\sqrt{2}$, $B=\sqrt{3/2}$ and $C=\sqrt{3}$, *curves* 50 and 51 remain as accurate representations of transmission coefficients 28P31, 28P30, and 28P32.

Figure 11:
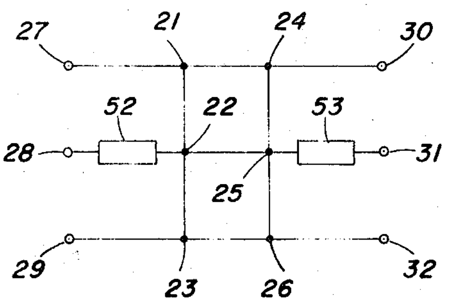
FIG. 11 is a schematic diagram of a modification of the present invention to enhance the operation thereof.
Figure 12:
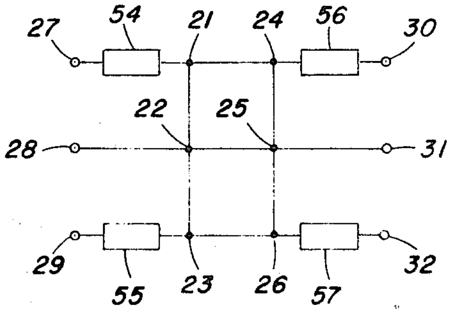
FIG. 12 is a schematic diagram of a further modification of the present invention.

Thus, it is seen that the properties exhibited by the present hybrid circuit are sufficiently stable whereby matched or reflectionless impedance means at each parts is not always required for the proper performance thereof. Further, a limited amount of unmatched characteristic admittances distributed throughout the hybrid circuit does not substantially alter the distinctive features thereof. The admittance of the hybrid circuit as referenced from port 27 is symmetrical with the admittance of the hybrid circuit as referenced from port 29, although these symmetrical admittances are not necessarily equal to the admittance of the hybrid circuit as referenced from port 28. Thus, the characteristic admittances $A$, $B$, and $C$ must assume specific values to provide substantially zero reflections of electromagnetic waves at the ports of the hybrid circuit. This, however, tends to limit the flexibility of the hybrid circuit and it is preferred not to so specify the characteristic admittances. Alternatively, reflections at the ports may be eliminated by providing appropriate terminating means at ports 27, 29, 30, and 32 and by coupling matching circuit means to ports 28 and 31, respectively. FIG. 11 illustrates the present hybrid circuit wherein conventional matching circuit 52 is interposed between junction 22 and port 28, and matching circuit 53 is interposed between junction 25 and port 31. Such matching circuits are well known to those of ordinary skill in the electromagnetic wave transmission art and need not be described further herein. A typical example thereof is a quarter wavelength matching circuit. An alternative to FIG. 11, but a satisfactory equivalent thereof, is illustrated in FIG. 12 wherein ports 27, 29, 30, and 32 are coupled to matching circuits. More specifically, matching circuit means 54 is interposed between junction 21 and port 27. Matching circuit means 54 may comprise a quarter wavelength matching circuit or any other conventional matching circuit in accordance with the particular application of the hybrid circuit of the present invention. Also, matching circuit means 55, which may be similar to matching circuit means 54, is interposed between junction 23 and port 29; matching circuit means 56 is interposed between junction 24 and port 30; and matching circuit means 57 is interposed between junction 26 and port 32.

Although the foregoing has described specific embodiments of the hybrid circuit having three pairs of ports, each pair subtending a conducting means, the present invention is not limited thereto. FIG. 13 illustrates a more general embodiment of the present invention and comprises n spaced conducting means $58_1 \ldots 58_n$, a first set of $n$ ports $61_1 \ldots 61_n$, a second set of $n$ ports $62_1 \ldots 62_n$, and conducting means 59 and 60. Each of ports $61_1 \ldots 61_n$ is coupled to one end of a corresponding one of conducting means $58_1 \ldots 58_n$ and each of ports $62_1 \ldots 62_n$ is coupled to another end of a corresponding one of conducting means $58_1 \ldots 58_n$ at a location remote from said ports $61_1 \ldots 61_n$. Conducting means 59 and 60 are disposed in intersecting relationship with conducting means $58_1 \ldots 58_n$ to form discrete junctions at the points of intersection. Those portions of conducting means $58_1 \ldots 58_n$, 59 and 60 that are interposed between adjacent junctions are of a length equal to an integral multiple of a quarter of the wavelength of an electromagnetic wave for which the hybrid circuit of FIG. 13 is adapted. Thus, it is seen that this hybrid circuit is similar to the aforedescribed hybrid circuits. The symmetry of the hybrid circuit of FIG. 13 admits of an analysis similar to that described hereinabove, and the characteristic admittances thereof may be determined in a manner similar to that explained with respect to FIGS. 4A–4C. Consequently, a single electromagnetic wave may be divided by the hybrid circuit of FIG. 13 into $n$ electromagnetic waves, said $n$ electromagnetic waves bearing relative proportions as designated by the appropriate characteristic admittances. The hybrid circuit may be comprised of a unitary structure similar to that described with respect to FIGS. 5–7, and the various transmission coefficients and signal coupling between ports are generally similar to those aforedescribed.

The prior art has found that the characteristics of the hybrid circuit of FIG. 1 may be maintained over a relatively large bandwidth by increasing the number of intersecting conducting means, heretofore identified by reference numerals 7 and 8, and by increasing the longitudinal dimension of the hybrid circuit. FIG. 14 illustrates this modification of the ladder-type hybrid circuit wherein conducting means 5 and 6 are intercoupled by conducting means $63_1 \ldots 63_n$. The attributes of this configuration are well-known and need not be described. The embodiment of the present invention illustrated in FIG. 13 may likewise be modified to admit of broad bandwidth characteristics. FIG. 15 illustrates a general embodiment of the present invention and comprises 2 $n$ ports $61_1 \ldots 61_n$ and $62_1 \ldots 62_n$, n spaced conducting means $58_1 \ldots 58_n$ and $m$ spaced conducting means $64_1 \ldots 64_m$, wherein $n$ is an integer greater than two and $m$ is an integer greater than one. The $2n$ ports are arranged in $n$ pairs and each pair of ports is provided with an associated conducting means $58_1 \ldots 58_n$ which serves as a conducting channel therebetween. Each of the $m$ spaced conducting means $64_1 \ldots 64_m$ is disposed to intersect each of the n spaced conducting means $58_1 \ldots 58_n$ to form a discrete junction at each point of intersection. clearly, the total number of discrete junctions thus formed is equal to the product of $n$ and $m$. The effective length of each portion of conducting means $58_1 \ldots 58_n$ interposed between adjacent junctions is equal to an integral multiple of one fourth of the wavelength of an electromagnetic wave supplied to the hybrid circuit. The effective length of each portion of conducting means $64_1 \ldots 64_m$ interposed between adjacent junctions is also equal to an integral multiple of one fourth of the wavelength of an electromagnetic wave supplied to the hybrid circuit. It should be understood, however, that the length of each of said portions need not be equal to the same integral multiple. The characteristic admittances of the hybrid circuit of FIG. 15 may be determined in a manner similar to that described hereinabove, and admit of the aforedescribed relationship; and the transmission coefficients thereof may be similarly illustrated as those graphically represented in FIGS. 8–10. The properties of the general embodiment of FIG. 15 correspond to those described with respect to FIG. 3. Of course, the hybrid circuit of FIG. 15 may provide at least n electromagnetic waves in response to a single supplied electromagnetic wave, and may synthesize a single electromagnetic wave from n supplied electromagnetic waves. Further, the hybrid circuit illustrated in FIG. 15 may comprise a unitary structure of intersecting coaxial cable means, waveguide means or strip transmission line means, as well as other conventional electromagnetic wave transmission means.

While this invention has been particularly shown and described with reference to exemplary embodiments thereof, it will be obvious to those skilled in the art that the foregoing and various other changes and modifications in form and details may be made without departing from the spirit and scope of the invention. It is therefore, intended that the appended claims be interpreted as including all such changes and modifications.

What is claimed is:

1. A hybrid circuit of unitary construction having at least three ports of a first set and a like number of ports of a second set symmetrically arranged with respect to said first-set ports for transmitting electromagnetic waves between one of said first-set ports and at least three of said second-set ports, comprising first conductors for said waves, each interconnecting one of said first-set ports and the corresponding one of said second-set ports, and at least two second conductors for said waves, each of said first conductors crossing said at least two second conductors to form junctions which can transmit said waves, the electric lengths of said first and said second conductors between the adjacent junctions being substantially equal to positive integral multiples of a quarter wavelength of said waves as propagated along said conductors, said positive integral multiple including one times said quarter wavelength.

2. A hybrid circuit in accordance with claim 1 wherein said first conductors and said second conductors comprise a unitary structure of intersecting coaxial cable means.

3. A hybrid circuit in accordance with claim 1 wherein said first conductors and said second conductors comprise a unitary structure of intersecting rectangular waveguide means.

4. A hybrid circuit in accordance with claim 3 wherein said rectangular waveguide means are disposed such that the longitudinal axes of said rectangular waveguide means determine a plane.

5. A hybrid circuit in accordance with claim 1 wherein said first conductors and said second conductors comprise a unitary structure of intersecting strip conducting means.

6. A hybrid circuit in accordance with claim 5 wherein said intersecting strip conducting means comprises:

a plate of conducting material disposed in a first plane;

dielectric material mounted on said plate of conducting material;

first strips of conducting material corresponding to said respective first conductors and mounted on said dielectric material in a second plane parallel to said first plane; and second strips of conducting material corresponding to said respective second conductors and mounted on said dielectric material in said second plane; said second strips of conducting material intersecting said first strips of conducting material in perpendicular relation.

7. A hybrid circuit, comprising:

*n* spaced conducting means, where *n* is an integer greater than two;

*n* input ports coupled to corresponding ones of said *n* spaced conducting means;

*m* spaced conducting means, where *m* is an integer greater than one; each of said m spaced conducting means being disposed to intersect each of said *n* spaced conducting means to form discrete junctions; the total number of discrete junctions formed by the intersections of said m spaced conducting means and said n spaced conducting means being equal to the product of *n* and *m;* said discrete junctions forming an array such that the effective length of the portion of each of said *n* spaced conducting means interposed between adjacent ones of said discrete junctions is equal to an integral multiple of one fourth of the wavelength of *a* supplied electromagnetic wave and the effective length of the portion of each of said *m* spaced conducting means interposed between adjacent ones of said discrete junctions is equal to an integral multiple of one fourth of the wavelength of said electromagnetic wave; and the characteristic admittance of said portion of each of said n spaced conducting means interposed between adjacent ones of said discrete junctions is equal to $\sqrt{3}$ times the characteristic admittance of said portion of each of said *m* spaced conducting means interposed between adjacent ones of said discrete junctions; and

*n* output ports coupled to corresponding ones of said *n* spaced conducting means for providing said electromagnetic wave having an equal amplitude at each of said output ports in response to said electromagnetic wave supplied to one of said input ports and for providing said electromagnetic wave at said one input port with an amplitude equal to the sum of the equal amplitudes of said electromagnetic wave provided at each of said output ports.

8. A hybrid circuit, comprising:

*n* spaced conducting means, where *n* is an integer greater than two;

*n* input ports coupled to corresponding ones of said *n* spaced conducting means;

*m* spaced conducting means, where *m* is an integer greater than one; each of said *m* spaced conducting means being disposed to intersect each of said *n* spaced conducting means to form discrete junctions, the total number of discrete junctions formed by the intersections of said *m* spaced conducting means and said *n* spaced conducting means being equal to the product of *n* and *m;* said discrete junctions forming an array such that the effective length of the portion of each of said n spaced conducting means interposed between adjacent ones of said discrete junctions is equal to an integral multiple of one fourth of the wavelength of a supplied electromagnetic wave and the effective length of the portion of each of said *m* spaced conducting means interposed between adjacent ones of said discrete junctions is equal to an integral multiple of one fourth of the wavelength of said electromagnetic wave;

*n* output ports coupled to corresponding ones of said *n* spaced conducting means;

first quarter wavelength matching circuit means coupled between an input port of at least one of said *n* spaced conducting means and one of said junctions nearest to said last-mentioned port; and second quarter wavelength matching circuit means coupled between an output port of said one of said *n* spaced conducting means and an additional one of said junctions nearest to said last-mentioned port; said first and second circuit means inhibiting said electromagnetic wave supplied to one of said input ports and received at all said output ports from appearing at any other input ports.

9. A hybrid circuit in accordance with claim 8 wherein *n* is equal to three and wherein non-adjacent ones of said three input ports are coupled to said first quarter wavelength matching circuit means, respectively, and non-adjacent ones of said three output ports are coupled to said second quarter wavelength matching circuit means, respectively.

10. A hybrid circuit, comprising:

at least three spaced conducting means;

at least three input ports coupled to corresponding ones of said three spaced conducting means;

at least three output ports coupled to corresponding ones of said three spaced conducting means; said input and output ports associated in pairs as coupled to said respective three spaced conducting means; each of said three spaced conducting means serving as a conducting channel between said individual pairs of said input and output ports; and at least two spaced conducting means, each being disposed to intersect each of said three spaced conducting means to form discrete junctions in an array such that the effective length of the portion of each of said three spaced conducting means interposed between adjacent ones of said discrete junctions is equal to an integral multiple of one fourth of the wavelength of a supplied electromagnetic wave and the effective length of the portion of each of said two spaced conducting means interposed between adjacent ones of said discrete junctions is equal to an integral multiple of one fourth of the wavelength of said electromagnetic wave; and the characteristic admittance of said portion of each of said three spaced conducting means interposed between adjacent ones of said discrete junctions and the characteristic admittance of said portion of each said two spaced conducting means interposed between adjacent ones of said discrete junctions are equal such that said electromagnetic wave supplied to an input port of one of said pairs of input and output ports is inhibited from being transmitted to the output port of said one pair of input and output ports but is transmitted to input and output ports of the remaining pairs of said input and output ports.

11. A signal distribution network having a plurality of ports adapted to receive and transmit electromagnetic waves, comprising:

three electromagnetic wave transmission means, each of said electromagnetic wave transmission means serving as a conducting channel between individual pairs of said ports; and two electromagnetic wave transmission means disposed in intersecting relationship with said three electromagnetic wave transmission means such that each of said two electromagnetic wave transmission means intersects each of said three electromagnetic wave transmission means to form a discrete junction at each point of intersection; each of said three electromagnetic wave transmission means including a portion interposed between said two electromagnetic wave transmission means, said portion having a length equal to a multiple of a quarter wavelength of said electromagnetic waves; and each of said two electromagnetic wave transmission means including first and second portions, said first portion being interposed between a first and a second of said three electromagnetic wave transmission means and a second portion being interposed between a second and a third of said three electromagnetic wave transmission means, each of said first and second portions having a length equal to a multiple of a quarter wavelength of said electromagnetic waves; each said portion of said three electromagnetic wave transmission means and each said first and second portions of said two electromagnetic wave transmission means exhibit characteristic admittances admitting of the relation:

$$1+2A^2-BC=0$$

$$B=C$$

where $A$ represents the characteristic admittance of said first portion and said second portion of each of said two electromagnetic wave transmission means, $B$ represents the characteristic admittance of said portion of said first and third of said three electromagnetic wave transmission means, and $C$ represents the characteristic admittance of said portion of said second of said three electromagnetic wave transmission means.

12. A signal distribution network in accordance with claim 11 wherein the proportional value of the characteristic admittance of each portion of each electromagnetic wave transmission means is determinative of the respective amplitudes of the electromagnetic waves transmitted to said ports.

* * * * *